No. 867,366. PATENTED OCT. 1, 1907.
J. HEBERLING.
DUMPING WAGON.
APPLICATION FILED JAN. 6, 1906.
3 SHEETS—SHEET 1.
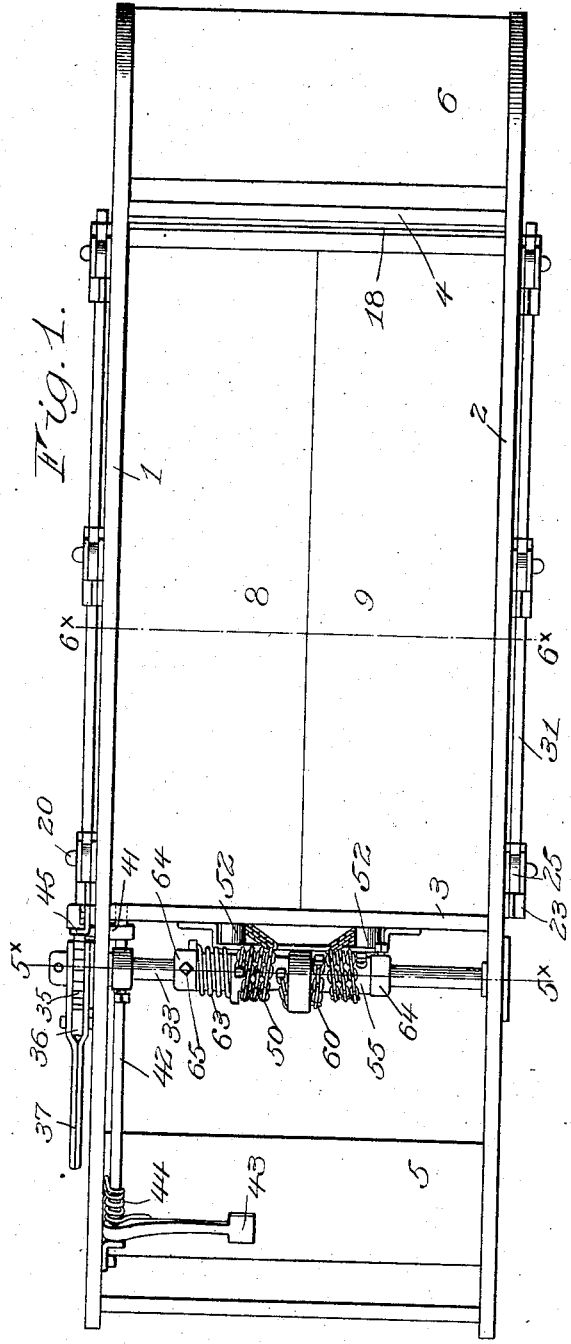
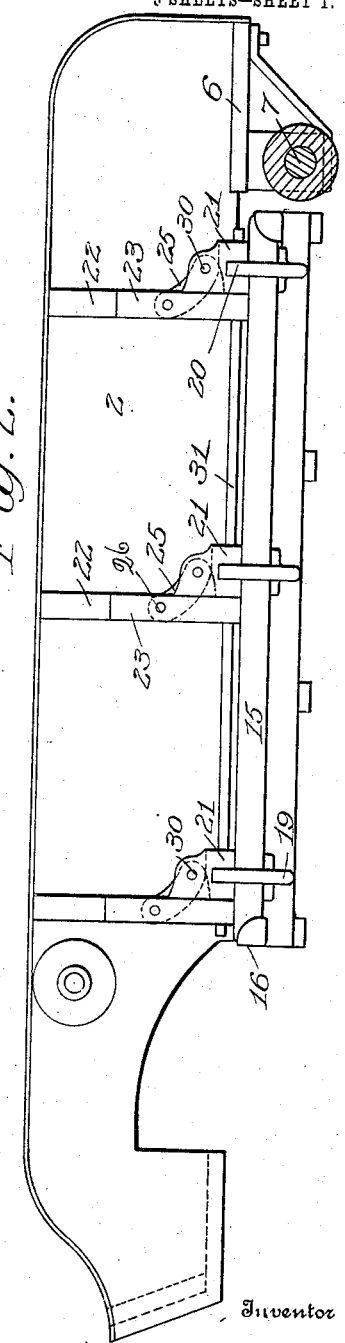
Witnesses
Walter B. Payne
Florence E. Franck
Inventor
John Heberling
By Frederick F. Church
his Attorney No. 867,366. PATENTED OCT. 1, 1907.
J. HEBERLING.
DUMPING WAGON.
APPLICATION FILED JAN. 6, 1906.
3 SHEETS—SHEET 2.
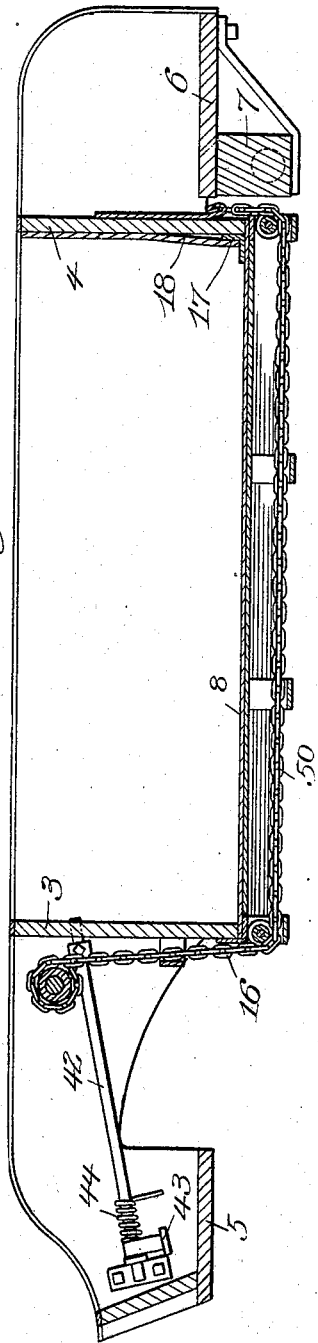
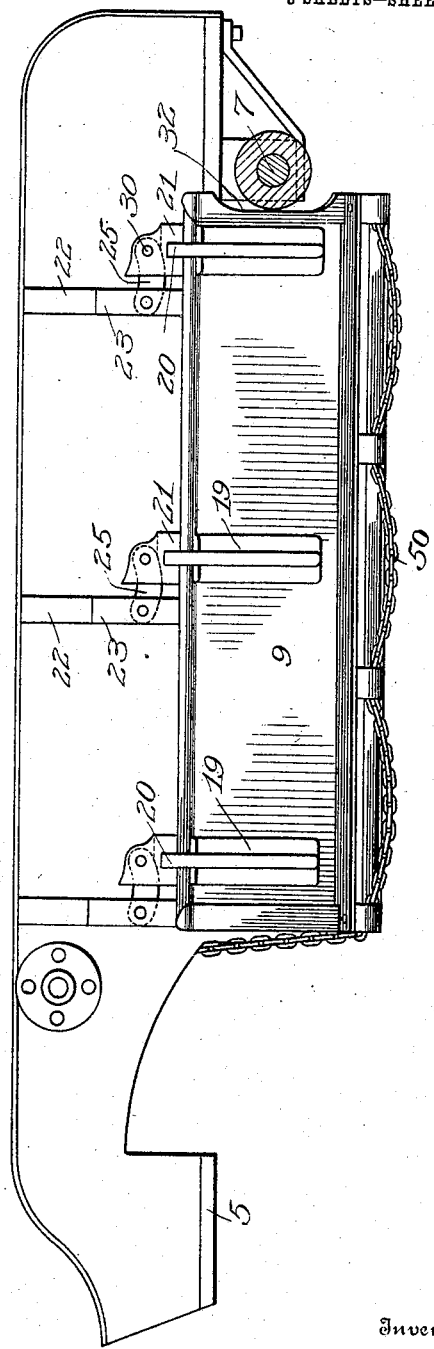

No. 867,366. PATENTED OCT. 1, 1907.
J. HEBERLING.
DUMPING WAGON.
APPLICATION FILED JAN. 6, 1906.
3 SHEETS—SHEET 3.
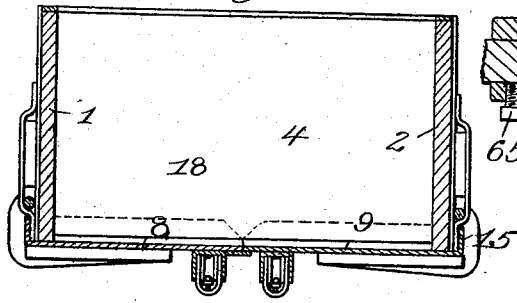
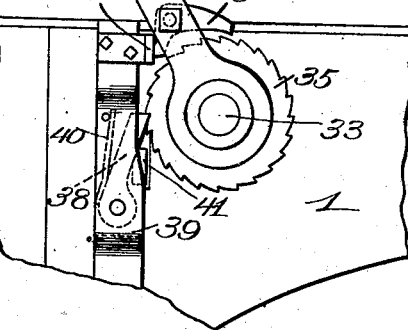
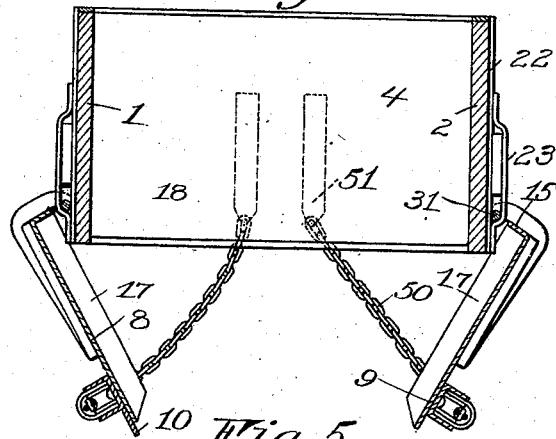
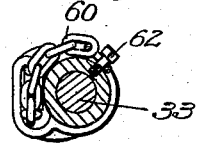
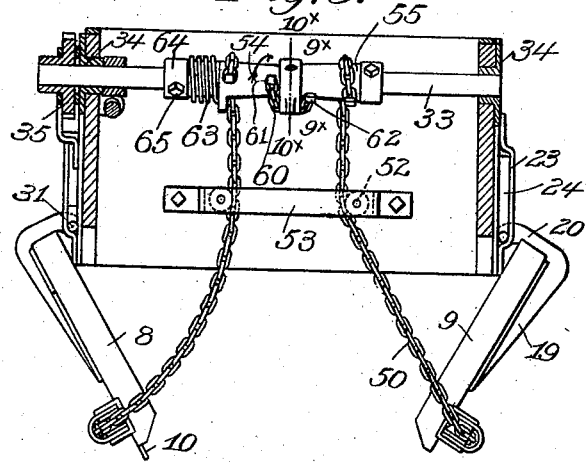
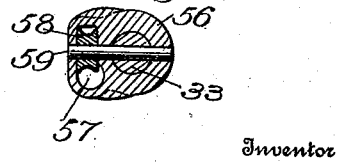
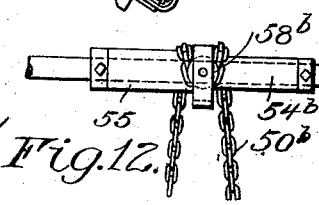

UNITED STATES PATENT OFFICE.

JOHN HEBERLING, OF ROCHESTER, NEW YORK.

DUMPING-WAGON.

No. 867,366.  Specification of Letters Patent.  Patented Oct. 1, 1907.

Application filed January 6, 1906. Serial No. 294,837.

*To all whom it may concern:*

Be it known that I, JOHN HEBERLING, of Rochester, in the county of Monroe and State of New York, have invented certain new and useful Improvements in Dumping-Wagons; and I do hereby declare the following to be a full, clear, and exact description of the same, reference being had to the accompanying drawings, forming a part of the specification, and to the reference-numerals marked thereon.
My present invention relates to wagons and particularly to that class employed for transporting earth or similar material which are constructed with boxes having movable bottoms adapted to be operated to deposit their contents and it has for its object to provide a wagon in which the bottom section or sections are capable of upward movement relatively to the box when in an open position, to permit them to readily disengage themselves from the deposited material.

My invention has for its further object to provide improved means for operating the bottom sections into closed position whereby each of them may be drawn tightly into place throughout their length, irrespective of inequalities in the length of the operating connections, such as the chains or cables usually employed.
To these and other ends the invention consists in certain improvements and combinations of parts all as will be hereinafter more fully described, the novel features being pointed out in the claims at the end of the specification.
In the drawings: Figure 1 is a top plan view of a wagon constructed in accordance with my invention. Fig. 2 is a side elevation thereof. Fig. 3 is a similar view showing one of the bottom sections in an open and elevated position. Fig. 4 is a longitudinal sectional view. Fig. 5 is a front elevation shown partly in section. Fig. 6 is a cross sectional view on the line $6^{\times} 6^{\times}$ of Fig. 1 showing the bottom sections or doors in the open or released position. Fig. 7 is a similar view showing the bottom sections or doors closed. Fig. 8 is a detail view of the winding shaft ratchet wheel and coöperating parts. Fig. 9 is a detail sectional view on the line $9^{\times} 9^{\times}$ of Fig. 5. Fig. 10 is a similar view on the line $10^{\times} 10^{\times}$ of Fig. 5. Fig. 11 is a sectional view showing a modified construction of the equalizing device arranged between the winding drums, and Fig. 12 is a view also showing a further modified connection between the drums.

Similar reference numerals in the several figures indicate similar parts.
A wagon constructed in accordance with my invention comprises a box having the sides 1 and 2 and forward and rear ends 3 and 4 respectively. The ends of the side pieces extend beyond the forward and rear ends of the box and are connected by the foot board 5 and a platform 6 which parts are located respectively above the forward axle, which is omitted from the illustration, and the rear axle or bolster 7. The bottom of the box is composed of the longitudinally extending movable sections or doors 8 and 9 the inner edges of which meet at the center line of the box, the joint thus formed being closed by a batten 10 secured on the lower side of the section 8. The outer edge of each door or section is provided with an upwardly extending flange 15 which projects over the outer edge of the side piece of the box and at its forward end overlaps the outer face of the end 3, as indicated at 16. At the rear end of each door is a corresponding rib or flange 17 lying adjacent the inner face of the end 4, when the sections or doors are closed, and projecting thereover is a shield 18 which prevents material carried in the box from passing outwardly beneath the flange and the adjacent end of the box.

A plurality of hinge members is provided on the bottom sections each of which has a foot 19, by means of which it is secured to the bottom of the section, and an upwardly extending arm 20, the end of which terminates above the flange 15 and is connected to a coöperating hinge member 21 resting against the side pieces 1 and 2 of the box. Arranged on the latter are vertically extending bearing pieces 22 having overlapping straps 23 which are spaced therefrom to form channels or guideways 24, as shown in Figs. 5, 6 and 7, in which the upper ends of links 25 are pivotally secured by pins or bolts 26. The links extend downwardly and rearwardly and their lower ends are fitted in recesses in the hinge members 21 to which they are pivotally secured by pins 30. The forward faces of the hinge members 21 are adapted to abut against the bearing pieces 22 and the straps 23 which limit their forward movement and the links 25 are preferably curved slightly to increase the area of their side surfaces to afford broad bearings which engage the adjacent sides of the channels 24 and the recesses in the hinge members to relieve the lateral strain on the pins 26 and 30 when the doors engage the deposited material during the time a wagon is being drawn forwardly. The pintle or knuckle of the several hinge members for each bottom section or door is formed by a single rod 31 extending longitudinally at the side of the box and passing through the several channels 24 and the registering perforations in the arms 20 and the coöperating hinge members 21. This construction provides additional means for movably securing the hinge members in position at the sides of the wagon box as the rod moves vertically and longitudinally with its bottom section or door and engages the straps 23, beneath the links and prevents them from being strained or twisted.

It is desirable to provide wagons of this character with a comparatively short wheel base by using a short wagon box, the capacity of which is maintained by locating the bottom beneath the plane of the foot board and rear platform or axle bolster, and to this end the rear axle 7 is located in proximity to the rear end 4 of the box. To prevent the interference of the bottom sections or doors by engagement either with the axle, or the inner ends of the wheel hubs, when in an open position and moved longitudinally, I provide each of their rear ends with recesses 32, in rear of the ribs 17, which lie beneath the bottom of the end piece 4 when the doors are in the normal position.

The mechanism for operating the bottom sections or doors 8 and 9 comprises a revoluble shaft 33 which preferably extends transversely of the wagon box and is journaled in bearings 34 located in the forwardly projecting ends of the side pieces 1 and 2 adjacent the end piece 3. One end of the shaft projects beyond the side of the box and is provided with an operating ratchet wheel 35 with which coöperates a pawl 36 on an operating lever 37 having the bifurcated end the extremities of which are located at each side of the ratchet wheel and are journaled on the shaft. Coöperating with the ratchet wheel is a locking pawl 38 pivoted in a housing 39 on the side of the wagon box and normally held in operative position by the spring 40. Located in front of the locking pawl is a coöperating releasing finger 41 projecting through an aperture in the side piece of the wagon box and secured to a rock shaft 42, the forward end of which is located above the foot board 5 and provided with a foot releasing lever 43 and a torsional spring 44 operating it to normally hold the finger 41 in an inoperative position.

In order to release the operating pawl 36 at the limit of its movement in one direction, as indicated in Fig. 8, a stationary abutment or releasing projection 45 is employed which is secured to the side of the wagon box, in proximity to the ratchet wheel and is adapted to project forwardly between the ends of the lever 37 and to engage the lower side of the pawl 36 at a point below its pivot. This arrangement of the abutment 45 insures the automatic release of the pawl 36 if peradventure the operator neglects to move the lever 37 into the position to release the pawl as said lever will be rotated by the unwinding movement of the shaft into the position shown in Fig. 8 when the locking pawl 38 is released by pressure on the treadle 43.

Flexible connections, such as chains 50, are attached by anchor plates 51 to the rear end 4 of the box and extend beneath each of the bottom sections or doors their forward ends passing upwardly between the idlers 52, supported by the plate 53, on the end 3 and having their extremities attached to drums 54 and 55 mounted on a shaft 33.

In order to compensate for the unequal lengths of the flexible door operating connections, resulting either from the stretching of the connections or other causes, the drums are journaled on the shaft and a compensating connection which permits their differential movement is arranged between them enabling the shaft to be revolved to place an equal tension on both door connections whether they are of equal or unequal lengths.

In the preferred form of the apparatus embodying this feature of my invention I locate the drums at opposite sides of a collar 56, located centrally on the shaft 33 and having a recess 57 therein, containing a pulley 58 journaled on an axis formed by the pin 59 which passes transversely through the shaft and also forms means for securing the collar 56 thereto. Passing around this pulley is a short length of chain 60, or other suitable connection, the ends of which are carried rearwardly of the pulley and secured to the respective drums by bolts 61 and 62.

While it is preferable to employ the pulley 58, as it reduces the friction on the equalizing connection, it will be understood that any form of projection may be used which will operate as an abutment or means for loosely securing the equalizing connection to the shaft.

In order to close one of the doors in advance of the other so that the overlapping covering strip or batten thereon will automatically be brought into proper position beneath it, I provide means for taking up a portion of the winding connection of said door and subsequently letting it out after the door is closed and during the closing movement of the other door. One means of accomplishing this object consists in revolving one of the drums a partial rotation in advance of the other by suitable devices such as a coil spring 63 attached to one of them which is also connected to a collar 64, adjustably secured to the winding shaft by a set screw 65. The desired tension may be produced in the spring by rotating the collar 64 to cause the connected drums to move relatively to each other and normally advance one of them on the driving shaft, so that when the latter is rotated one of the doors or bottom sections will be closed in advance of the other. In the present instance it is desirable to close the door 9 in advance of the door 8 so that the batten 10 on the latter will overlap its inner edge when the parts are in a closed position, as shown in Fig. 7. The operation of these devices will be readily understood from an inspection of Fig. 5, in which the doors are shown in an open position with the winding connections 50 hanging loosely from the drums, permitting the spring 63 to rotate the drum 54 rearwardly, in the direction indicated by the arrow, drawing the flexible connection 60 around the pulley 58 and rotating the drum 55 in the opposite direction or to a relatively advanced position on the winding shaft. The rotation of the shaft 33 will cause both of the drums to revolve simultaneously to close the doors 8 and 9, but as the movement of the latter is arrested, by engagement with the lower side of the wagon-box, the drum 55 will be held stationary, relatively to the shaft 33 and a continued movement of the latter will rotate the drum 54 and tighten the connection of the door 8.

In Figs. 11 and 12 I have shown modifications of this form of the apparatus. In the first figure the winding drums 54a and 55a are provided at the proximate ends with bevel gear wheels 56 between which is located a bevel pinion 75 journaled upon a stud 76 passing through a collar 77 and the shaft 33a. The arrangement of these parts, it will be seen, also enables both of the drums to be revolved with the shaft and either one of them be arrested and the other to be rotated independently. The tension device, such as the spring 63a may be connected to one of the drums for moving them relatively in opposite directions for the purpose heretofore described.

If desired, the chains or equivalent connections 50 for operating the doors may be made of a single length, as shown in Fig. 12, its central portion 50ᵇ passing around the abutment formed by the pulley 58ᵇ and constituting the equalizing connection between the drums 54ᵇ and 55ᵇ. In order to take up one of the door connections to close said door in advance of the other the drum 55ᵇ may be made slightly larger in diameter than the other and as it is capable of yielding on the shaft 33ᵇ, by a relative rotary movement thereon when said door is closed, the connection thereon will be paid out to equalize with the door connection wound upon the other drum to allow the second door to be tightly closed.
The means of supporting the bottom sections or doors of a dumping wagon, which I have shown and described permits them to swing clear of the pile of deposited material and if their lower edges are engaged therewith, or contact with other obstructions, they may move rearwardly and be automatically disengaged by a relative upward movement imparted to them as the wagon box is drawn forwardly. Further, the arrangement of the parts of the winding shaft is such that the bottom sections may be drawn tightly into place beneath the box, throughout their length, preventing the contents of the box from sifting out during transportation.

I claim as my invention:

1. In a dumping wagon, the combination with a box and a movable bottom therefor, of links pivoted to the side of the box and movable longitudinally thereof, hinge connections between the links and the bottom and means for operating the latter.

2. In a dumping wagon, the combination with a box and a movable bottom therefor, of hinge members on the bottom and links pivotally connected to the hinge members and the side of box and movable longitudinally thereof and means for operating the bottom.

3. In a dumping wagon, the combination with a box and a movable bottom therefor, of links pivoted on the side of the box, hinge members also arranged at the side of the box and pivotally suspended on the links and pivotal connections between the hinge members and bottom and means for operating the latter.

4. In a dumping wagon, the combination with a box, a movable bottom therefor and a plurality of hinge members connected to the bottom and located at the side of the box, of links pivoted to said members and to the side of the box, a stop for limiting the movement of the bottom in one direction and means for operating the latter.

5. In a dumping wagon, the combination with a box having side pieces, straps arranged thereon and forming channels or guides, of a bottom on the box, hinge members on the bottom and a longitudinally extending rod movable longitudinally and vertically in the channels and engaging the members and means for operating the bottom.

6. In a dumping wagon, the combination with a box having side pieces, straps arranged thereon and forming vertically extending channels or guides, of a bottom on the box, hinge members on the bottom arranged in alinement with the lower ends of the channels and a pintle rod engaging the hinge members and extending longitudinally of the wagon box and movable longitudinally and vertically in the channels and means for operating the bottom.

7. In a dumping wagon, the combination with a box having side pieces, straps arranged thereon and links pivoted to the straps, of a movable bottom on the box, hinge members pivoted thereto and located at one side of the straps, pivoted connections between the ends of the links and said members and means for operating the bottom.

8. In a dumping wagon, the combination with a box having side pieces, straps secured thereon and spaced from the side of the box and links pivotally supported beneath the straps, of a movable bottom on the box, hinge members thereon extending over the side of the box and located in rear of the straps, pivoted connections between the links and said members and means for operating the bottom.

9. In a dumping wagon, the combination with a box having side pieces, straps secured thereon and spaced from the side of the box and curved links pivotally supported beneath the straps, of a movable bottom on the box, hinge members provided with transversely extending recesses receiving the ends of the links, pivot pins connecting them and means for operating the bottom.

10. In a dumping wagon, the combination with a box having side pieces, a plurality of straps secured thereon and spaced from the side of the box and a link pivotally supported beneath each strap, of hinge members attached to the links, a pintle rod extending beneath the straps and connecting the hinge members to the bottom and means for operating the latter.

11. In a dumping wagon, the combination with a box, a bottom section thereon and hinges supporting it, of means for supporting the hinges to permit the bottom section to move in a relative longitudinal and vertical direction on the box when in an open position and means for closing said section.

12. In a dumping wagon, the combination with a box comprising ends and side pieces and a movable bottom located beneath the box, of an upwardly extending rib on the bottom located adjacent one end of the box, a shield on the latter projecting over the rib and means for closing the bottom.

13. In a dumping wagon, the combination with a box, an axle bolster located in rear of and beneath the box and a bottom located beneath the box and provided with a recessed end and hinges at one side of the bottom, of means for supporting the hinges to permit the bottom to move rearward when in an open position into proximity with the axle and means for operating the bottom.

14. In a dumping wagon, the combination with a box comprising ends and side pieces, an axle bolster located in rear of and beneath the box and a hinged bottom located beneath the box and provided with a recess in its end beneath the end of the box, of means for supporting the bottom at the side of the box to permit its rearward movement when in an open position into proximity with the axle, a rib on the bottom projecting upwardly adjacent the inner side of the rear end of the box, a shield on the latter extending over the rib when the parts are in normal position and means for closing the bottom.

15. In a dumping wagon, the combination with a box, movable bottom sections and a revoluble shaft, of drums connected to the shaft and capable of an independent movement thereon, an equalizing connection between the drums, connections between the drums and bottom sections and means for rotating the shaft.

16. In a dumping wagon, the combination with a box, movable bottom sections thereon and a revoluble shaft, of drums connected to the latter and capable of an independent movement thereon and connections between them for rotating them relatively in opposite directions, separate connections between the drums and the bottom sections and means for rotating the shaft.

17. In a dumping wagon, the combination with a box, movable bottom sections thereon and a revoluble shaft, of drums journaled on the latter, means connecting the drums and connecting them to the shaft to permit their relative movement thereon, separate operating connections between the drums and bottom sections and means for rotating the shaft.

18. In a dumping wagon, the combination with a box, movable bottom sections thereon and a revoluble shaft, of drums journaled on the latter, means connecting the drums to each other and to the shaft to permit their differential movement and means for moving one of the drums into a position on the shaft in advance of the other, connections between the drums and the bottom sections and means for operating the shaft.

19. In a dumping wagon, the combination with a box, movable bottom sections thereon and a revoluble shaft, of drums journaled on the latter, means connecting the drums to each other and to the shaft to permit their differential movement and a spring connecting the shaft and one of the drums to rotate it on the shaft into a position in advance of the other, a separate connection between each drum and bottom section and means for rotating the shaft.

20. In a dumping wagon, the combination with a box, movable bottom sections thereon and a winding shaft, of a pulley journaled on the shaft on an axis extending transversely thereof, a drum located at each side of the pulley and a flexible connection between the drums, winding connections between the latter and the bottom sections and means for operating the shaft.

21. In a dumping wagon, the combination with a box, movable bottom sections thereon and a winding shaft, of a pulley journaled on the shaft on an axis extending transversely thereof, a drum located at each side of the pulley and a flexible connection between the drums, means normally operating one of the drums on the shaft to a position in advance of the other, separate winding connections between the drums and the bottom sections and means for operating the shaft.

22. In a dumping wagon, the combination with a box, a movable bottom section thereon, a winding shaft and means for operating it, of connections between the shaft and the bottom section, a ratchet wheel on the shaft and a locking pawl coöperating therewith, a rock shaft journaled on the box having a finger coöperating with the pawl to move it into an inoperative position and a foot lever attached to the shaft.

23. In a dumping wagon, the combination with a box comprising ends and side pieces, a movable bottom section thereon, a winding shaft connected to the bottom section and journaled between the side pieces and having an end projecting exteriorly of one of the side pieces of box and a ratchet wheel mounted on said end, of a locking pawl coöperating therewith, a rock shaft located within said side piece of the box and having an operating finger coöperating with the pawl, an operating foot lever on the rock shaft and means coöperating with the ratchet wheel to rotate the winding shaft in one direction.

24. In a dumping wagon, the combination with a box comprising ends and side pieces, a movable bottom section thereon, a winding shaft connected to the bottom section and journaled between the side pieces and having an end projecting exteriorly of one of the side pieces of box and a ratchet wheel mounted on said end, of an operating lever journaled on the shaft and carrying an operating pawl coöperating with the ratchet wheel, a stationary finger mounted on the box and projecting over said wheel and coöperating with the operating pawl to release it, means for locking the winding shaft in operative position and devices for releasing it.

25. In a dumping wagon, the combination with a box, movable bottom sections thereon and a winding shaft, of connections between the latter and said sections, means for taking up one of said connections on the shaft to cause its respective bottom sections to close in advance of the other section, and means for operating the shaft.

26. In a dumping wagon, the combination with a box, movable bottom sections thereon and a winding shaft, of connections between the latter and said sections, means operating to yieldingly take up one of said connections on the shaft to cause its respective bottom section to close in advance of the other section and pay it out during the closing movement of the other section.

JOHN HEBERLING.

Witnesses:
G. WILLARD RICH,
M. I. ST. HELENS.